United States Patent [19]

Goldsmith

[11] 4,259,282

[45] Mar. 31, 1981

[54] ADOBE BRICK MAKING MACHINE AND METHOD

[76] Inventor: Milton T. Goldsmith, Box 703, Chino, Ariz. 86323

[21] Appl. No.: 67,295

[22] Filed: Aug. 17, 1979

[51] Int. Cl.[3] .......... B29C 17/00

[52] U.S. Cl. .......... 264/148; 264/176 R; 264/177 R; 264/323; 425/316

[58] Field of Search .......... 264/148, 176 R, 177 R, 264/323

[56] References Cited

U.S. PATENT DOCUMENTS

| | | | |
|---|---|---|---|
| 739,881 | 9/1903 | Kilborn | 425/131.1 |
| 1,771,660 | 7/1930 | Stewart | 425/131.1 |
| 1,973,092 | 9/1934 | Mooney | 425/306 |
| 2,191,106 | 2/1940 | Denison et al. | 264/148 |
| 2,787,040 | 4/1957 | Morelli et al. | 425/62 |
| 3,225,409 | 12/1965 | Huffaker | 425/62 |
| 3,283,051 | 11/1966 | Anderson | 425/316 |
| 3,774,890 | 11/1973 | Lemelson | 425/202 |

*Primary Examiner*—Maurice J. Welsh
*Attorney, Agent, or Firm*—Cahill, Sutton & Thomas

[57] ABSTRACT

An adobe brick making machine includes a hopper supported by a frame which is mounted on a plurality of wheels which permit the adobe brick making machine to roll along a support surface.

8 Claims, 10 Drawing Figures

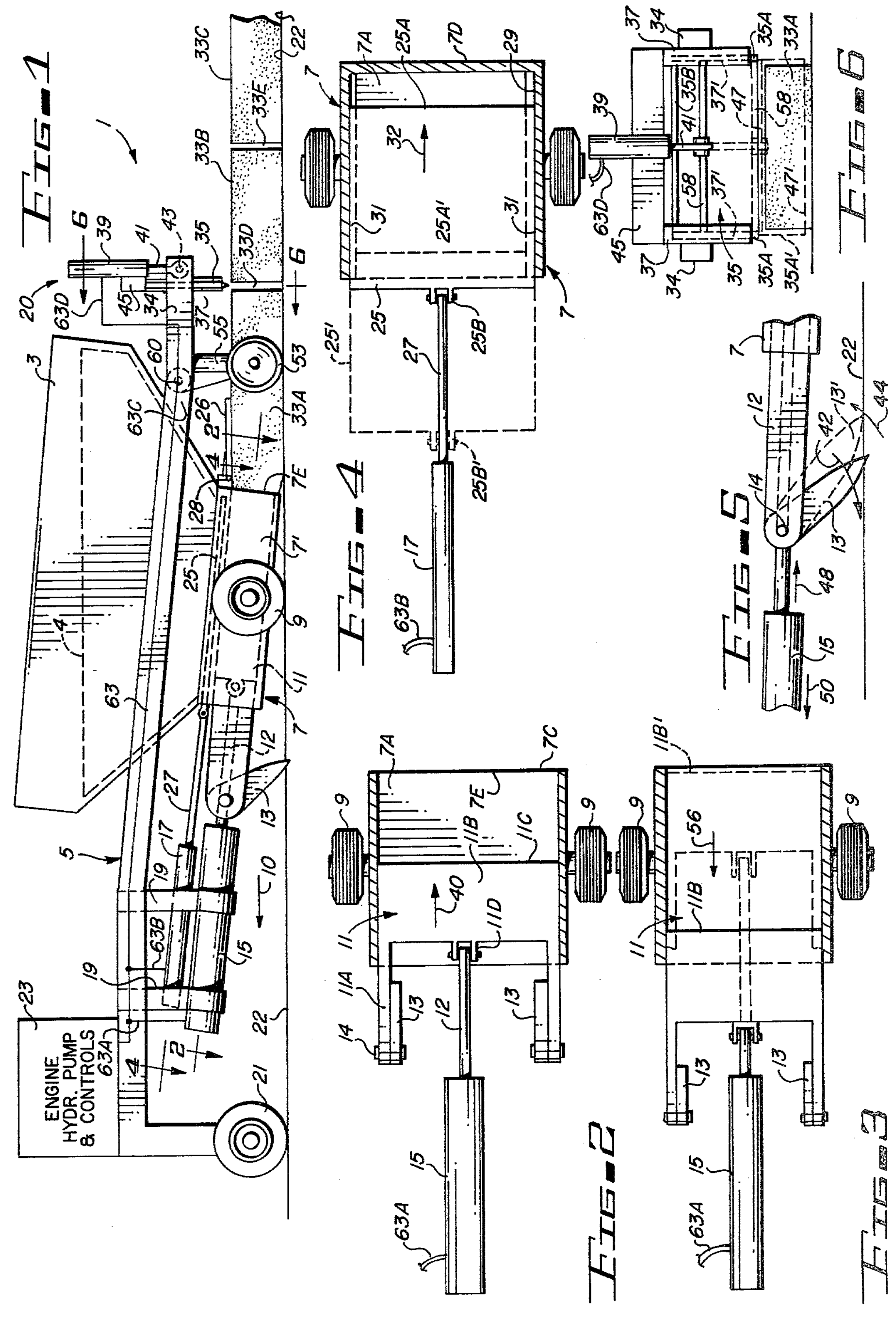
ENGINE
HYDR. PUMP
& CONTROLS

ADOBE BRICK MAKING MACHINE AND METHOD

BACKGROUND OF THE INVENTION

1. Field of the Invention

The invention relates to brick making machines, and more particularly, to mobile brick making machines which produce adobe brick blocks in such a manner that minimum handling of the moist adobe bricks is required.

2. Description of the Prior Art

Adobe bricks are made of alluvial clay which is abundant in many parts of the world, especially in the Southwestern portion of the United States. Where this type of clay is in plentiful supply, it has long been the practice to make adobe building blocks by mixing the clay with water and straw and various other materials, compressing this mixture into blocks, and then permitting the blocks to harden by baking and drying them in the sun. Adobe blocks have been used for residential dwellings for many years in the Southwest part of the United States. Other structures made of adobe have been utilized in the Southwest portion of the United States for centuries. The use of adobe blocks has many advantages. For example, adobe blocks can be economical to manufacture, since the basic material, the alluvial clay, is cheap and plentiful. Further, adobe blocks have excellent insulating and heat retention properties which are superior to those of most building materials. Many buildings composed of adobe are still standing and are still in use after several hundred years of use and exposure to the elements. It has been conventional practice to make adobe blocks by hand. However, with increasing labor costs and increasing demand for adobe blocks, their cost has increased to the point where adobe blocks are not as commonly used as they once were and are in fact more expensive than conventional masonry building blocks.

Accordingly, it is an object of the invention to provide a machine and method for making adobe building blocks at a high rate of speed.

It is another object of the invention to provide a machine and method for making adobe building blocks, which machine and method requires minimum amounts of manual labor.

A further object of the invention is to provide a machine for making blocks from a material having a high degree of plasticity and requiring minimum handling of blocks so produced until the produced blocks have properly cured.

Several machines and processes for making adobe bricks have been proposed in order to reduce the labor costs previously involved in making adobe bricks. For example, U.S. Pat. No. 3,142,105 discloses a very complex machine which excavates soil or clay to be used in the process of making the adobe bricks, mixes the constituent components of the adobe bricks, adding water and stabilizer materials, and forms bricks by spreading wet adobe material or mud deposited from a hopper of the machine into a mold box, which molds a set of blocks. The mold box is then raised, depositing the set of molded blocks on the recently excavated ground. The device disclosed in U.S. Pat. No. 3,142,105 is unduly complex and costly.

U.S. Pat. No. 2,787,040 discloses a mobile adobe brick making machine which excavates soil and extrudes bricks which are discharged out of an opening, and must be received from the opening and placed on the ground or elsewhere for curing. This device requires handling of each extruded moist adobe brick in order to place it in an appropriate location for drying and curing, and also requires one or more operators to operate the machine.

U.S. Pat. No. 3,225,409 discloses another adobe brick making machine which extrudes and forms adobe brick. The device disclosed in U.S. Pat. No. 3,225,409 requires handling of each adobe brick immediately after it is formed in order to remove the brick from the machine and place the brick for drying and curing.

Accordingly, it is another object of the invention to provide an adobe brick making machine which obviates the need for handling of adobe blocks after they are formed by the machine but before they are dryed and cured.

It is yet another object of the invention to provide an adobe brick making machine and method which overcomes the shortcomings of the prior art.

A novelty search directed to the present invention uncovered the following additional patents, none of which meet the presently unmet requirements of the adobe brick making art: U.S. Pat. Nos. 739,881; 1,771,660; 3,283,051; 1,973,092; and 3,774,890.

SUMMARY OF THE INVENTION

Briefly described, and in accordance with one embodiment thereof, the invention provides a brick making machine which includes a hopper disposed on an extrusion chamber separated from the hopper by a slidable divider plate which can be retracted to allow plastic material contained in the hopper to be fed into the extrusion chamber, wherefrom the piston compresses the plastic material in the extrusion chamber, forcing the plastic material out of an extrusion orifice. The extrusion orifice is located approximately at the level of the ground or a support surface supporting the brick making machine. In the described embodiment of the invention, the plastic material is moist adobe material or mud. The sliding divider plate and the piston are actuated by means of first and second pneumatic cylinders, respectively, which are rigidly connected to the extrusion chamber. A pair of spikes or teeth attached to the piston engage the ground or support surface when the second pneumatic cylinder exerts force against the piston, causing moist adobe material in the extrusion chamber to be extruded. The engagement of the spikes with the ground prevents relative movement between the piston and the ground and also prevents deforming of the moist adobe material after it leaves the extrusion orifice. As the second pneumatic cylinder connected to the piston applies force to the piston and the spike engages the ground or support surface, a counterforce produced on the body of the second pneumatic cylinder causes the brick making machine to move forward, relative to the ground or support surface. A cutoff mechanism connected to the hopper or extrusion chamber measures the distance moved by the adobe brick making machine and stops the extrusion process when the adobe brick making machine has moved forward a predetermined distance equal to a desired dimension of adobe bricks and causes a transverse cutting edge to cut through the initially extruded block of adobe material. The extrusion process is then continued.

In the described embodiment of the invention, the cutoff mechanism measures distance traveled by the adobe brick making machine since the last cut by the cutoff mechanism by means of a spring-biased measuring wheel mounted on an axle having a plurality of cam surfaces thereon. When the measuring wheel rolls forward by a predetermined distance, one of the cam surfaces activates a control switch which causes a control system of the adobe brick making machine to stop the extrusion process and cause the cutting edge to cut through the extruded adobe material, thereby forming an individual adobe brick. In the described embodiment of the invention, the cutting edge is tautly suspended wire supported by a frame connected to a pneumatic cylinder mechanism. When the cut through the adobe material has been completed, the spring-biased measuring wheel is raised, and rotates back to an initial position, causing another cam surface to actuate another control switch which causes the extrusion process to be continued.

BRIEF DESCRIPTION OF THE DRAWINGS

FIG. 1 is a side view illustrating one embodiment of the present invention.

FIG. 2 is a partial sectional view taken along section lines 2—2 of FIG. 1, and is useful in explaining the structure and operation of the device of FIG. 1.

FIG. 3 is another sectional view which is similar to the sectional view of FIG. 2 and is useful in explaining the operation of the machine of FIG. 1.

FIG. 4 is a sectional view taken along section lines 4—4 of FIG. 1, and is useful in describing the operation of the machine of FIG. 1.

FIG. 5 is a partial side view illustrating the ground engaging spike of the device of FIG. 1.

FIG. 6 is a partial sectional view of the device of FIG. 1 taken along section lines 6—6 of FIG. 1.

DESCRIPTION OF THE INVENTION

Figure 7:
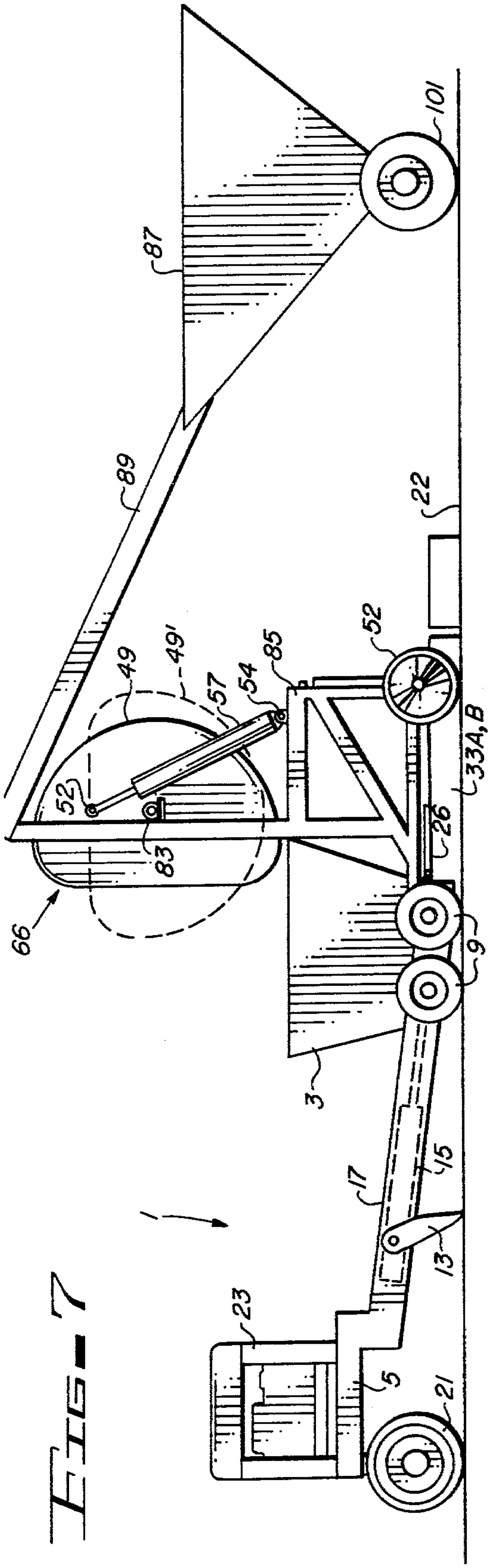
FIG. 7 is a side view of an alternate embodiment of the invention.

Referring now to the drawings, and particularly to FIG. 1, adobe brick making machine 1 includes a large hopper 3 having an open top. Hopper 3 may be filled with moist plastic adobe mud or material, as indicated by dotted line 4. (It should be noted that the term "plastic" as used herein means capable of being molded or modeled, or of being deformed permanently in any direction without rupture.) Hopper 3 has side walls which taper inward to join and be supported by a rectangular box-like structure 7, the walls of which bound an extrusion chamber 7'. The box 7 and hopper 3 are supported by means of a pair of side wheels 9. As subsequently explained, during the extrusion process for making adobe bricks, machine 1 moves forward in the direction indicated by arrow 10. A long rectangular block 33A of extruded adobe is extruded from extrusion chamber 7' and deposited directly upon the ground as machine 1 moves forward at the same rate as the extrusion rate. A cutoff knife 35 makes measured cuts in rectangular block 33A, leaving a trail of moist, uncured adobe bricks 33B, 33C etc. on ground surface 22, along which machine 1 rolls.

Now referring also to FIGS. 2, 3 and 4, a sliding divider plate 25 forms the bottom of the volume contained by hopper 3 and also serves as the top of extrusion chamber 7' when divider plate 25 is in its closed or extreme rearward position.

Referring particularly to FIGS. 1 and 4, divider plate 25 is connected by means of hinge 25B to rod 27 of pneumatic cylinder 17. Pneumatic cylinder 17 is connected by means of brackets 19 to frame 63, which is rigidly attached to hopper 3. Divider plate 25 slides along lips 31, which are disposed along the upper edges of side walls of box 11.

Thus, when dividing plate 25 is in the position indicated by dotted line 25', the adobe mud 4, which has a thick, plastic consistancy, settles into extrusion chamber 7'. Cylinder 17 is then actuated to slide divider plate 25 rearward in the direction indicated by arrow 32 until the rear edge 25A of divider plate 25 meets rear member 7D of box 11. At this point, closed divider plate 25 forms the top surface of rectangular extrusion chamber 7'.

Box 7 has a flat smooth bottom plate 7A which forms the bottom of extrusion chamber 7'.

The rear end of box 7 has a rectangular opening 7E, which serves as an extrusion orifice through which the block 33A is extruded as moist adobe material in extrusion chamber 7' is forced rearward by the flat face 11C of piston 11.

Piston 11 fits precisely yet slidably within the rectangular volume of extrusion chamber 7' and is forced rearward in the direction indicated by arrow 40 in FIG. 2 in order to extrude moist adobe material in extrusion chamber 7'. The body 11B of piston 11 is connected by means of hinge 11D to rod 12 of pneumatic cylinder 15. Pneumatic cylinder 15 is attached by means of brackets 19 to frame member 5 and is therefore rigidly positioned with respect to hopper 3 and extrusion chamber 7'.

A pair of opposed arms 11A extend rearward from the rear edges of piston 11. A pair of spikes are hinged to the extreme rearward ends of arms 11 by means of hinge elements 14, as seen in FIGS. 1, 2 and 5. The rotation of spike 13 in the direction indicated by arrow 42 is limited to approximately the angle shown by the solid lines 13 shown in FIG. 5, enabling spike 13 to dig into ground surface 22 when cylinder 15 applies force on piston 11 in the direction indicated by arrow 48 in FIG. 5. The counterforce produced by the internal piston (not shown) of cylinder 15 on rod 12 causes cylinder 15 to move forward in the direction indicated by arrow 50, thereby causing bracket 19, frame 5, hopper 3 and extrusion chamber 7' to move forward at the same rate that block 33A is extruded.

Thus, spike 13, by engaging or digging into ground surface 22, prevents pressure of piston 11 from being transmitted to moist adobe material which has already passed out of extrusion chamber 7' through rectangular opening 7E. Extruded block 33A therefore retains its shape and is not deformed by compressive forces produced by piston 11.

The progression of piston 11 in the rearward direction indicated by arrow 40 is illustrated by the sectional view shown in FIGS. 2 and 3. It should be noted that when cylinder 15 begins to withdraw piston 11 from extrusion chamber 7 in the direction indicated by arrow 56 in FIG. 3, spikes 13 pivot counterclockwise, as indicated by dotted lines 13' and arrow 44 in FIG. 5, allowing the sharp tips of spikes 13 to become disengaged from ground surface 22 as piston 11 is withdrawn from extrusion chamber 7'.

A floating screed 26 (FIG. 1) is hingably attached at pivot point 28 to the rear edge of hopper 3. Screed 26 is a flat, smooth piece of metal which slides along the smooth upper surface of block 33A as it is extruded. The weight of floating screed 26 rests on the upper moist surface of extruded block 33A as it is extruded. The weight of floating screed 26 on the upper moist surface of extruded block 33A prevents extruded block 33A from being sucked back into extrusion chamber 7' when piston 11 is withdrawn from extrusion chamber 7' in the direction indicated by arrow 56 in FIG. 3.

Figure 9:
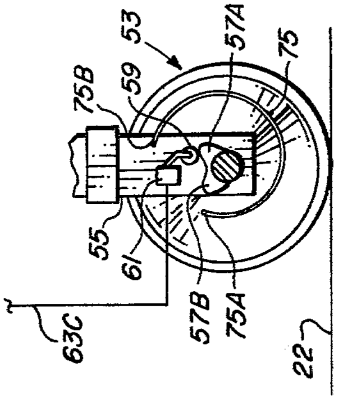
FIG. 9 is a detailed view of the mechanism associated with control wheel 53 of the device of FIG. 1.
Figure 10:
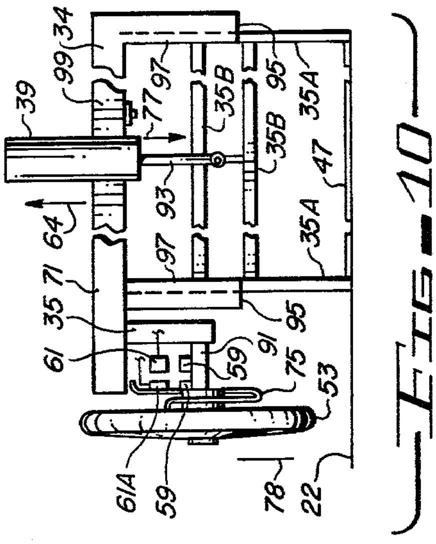
FIG. 10 is a partial rear view of the device of FIG. 1.

A cutoff mechanism 20 includes a frame element 34 hingably attached at hinge point 60 to frame member 5. Cutoff mechanism 20 also includes a measuring wheel 53 which rolls along ground surface 22 as machine 1 moves forward. Wheel 53 is connected by means of axle 91 and support 55 to frame 34, as shown in FIGS. 1, 9 and 10. The rod 41 of a pneumatic cylinder 39 is attached by connection 43 to the end of frame 34. The body of pneumatic cylinder 39 is attached to cutter element 35, which extends downward through guide 37. Referring now to FIG. 6, cutter element 35 includes a rigid frame including vertical side member 35A and horizontal cross members 35B. Cutter element 35 includes a taut cutting wire 37 connected to the lower ends of side elements 35A. Side elements 35A slide in grooves 37' of guide 37. Side members 35A are rigidly attached to cross bar 45, which is rigidly attached to the body of cylinder 39. Cylinder 39 is attached to frame 34 by means of cross bar 58.

The dotted lines indicated in FIG. 6 by reference numeral 35A illustrate the position of cutter 35 when it is lowered so that wire 47 cuts through the extruded moist adobe material, forming cuts 33D, 33E, etc. (FIG. 1). Reference numeral 47' illustrates the position of cutting wire 47 when cutter 35 is lowered.

Referring now to FIG. 10, it can be seen that when sufficient force is produced in the downward direction indicated by arrow 77 by pneumatic cylinder 39 to force side arms 35A and cutting wire 47' all the way through the extruded adobe material and against ground surface 22, the upward counterforce produced by pneumatic cylinder 39 on frame 34 causes frame 34 to pivot upward about pivot point 60 (FIG. 1) in the direction indicated by arrow 64, lifting measuring wheel 53 above ground surface 22.

Referring again to FIG. 1, it can be seen that frame 5 also supports an engine, a hydraulic pump, and various controls, collectively indicated by reference numeral 23. The front portion of frame 5 is supported by wheel 21, which is powered by means of the engine in block 23 and controls therein to enable an operator to easily move machine 1 from place to place when it is not in the process of extruding adobe brick material.

Pressurized pneumatic fluid for controlling pneumatic cylinders 15, 17 and 39 is coupled to those pneumatic cylinders by means of a pneumatic harness which is generally designated by reference numeral 63. Pneumatic harness 63 includes a plurality of pneumatic tubes through which pressurized pneumatic fluid flows. A pair of pneumatic tubes 63A extend from pneumatic harness 63 to pneumatic cylinder 15, and another pair of pneumatic tubes 63B extend from pneumatic harness 63 to pneumatic cylinder 17. Another pair of pneumatic tubes 63D extend from pneumatic harness 63 to pneumatic cylinder 39.

Control of the pneumatic system of FIG. 1 is achieved by means of a pair of control valves 61 and 61A mounted adjacent measuring wheel 53A in FIG. 10 and a cutter position sensing switch 99, also shown in FIG. 10.

Referring particularly to FIG. 3, measuring wheel 53 performs the function of halting extrusion by halting further extension of rod 12 from pneumatic cylinder 15 when a predetermined distance, for example 18 inches, has been traversed by adobe brick making machine 1. At this point, a cam 57A on the axle 91 which turns with measuring wheel 53 engages a roller 59, which actuates a microswitch 61. This causes a signal to be sent along conductor 63A to the control system in block 23 to cut off the fluid pressure in tubes 63A. Machine 1 stops rolling forward, and pressure is applied in pneumatic tube 63D to cause pneumatic cylinder 39 to rapidly move downward, thrusting cutting wire 47 through the extruded adobe material against ground surface 22, raising wheel 53 and frame 34. Frame 34 contacts microswitch 99.

Referring now to FIG. 9, it is seen that as measuring wheel 53 rotates, a spring 75, which is rigidly connected to a stationary point 75B at one end and connected to a portion of wheel 53 at point 75A, is flexed. (It should be noted that spring 75A is shown as illustrated in FIG. 9 for convenience only. In practice, a multiturn coil spring extending along axle 91 and attached to support 55 at one end and to wheel 53 or axle 91 at the other end of axle 91 could be utilized.).

Thus, when wheel 53 is lifted in the direction indicated by arrow 78 in FIG. 10, wheel 53 rotates back to an initial position, causing a second cam surface 57B to engage a second roller 59A, actuating a microswitch 61A, which sends a control signal to the control system in block 23, enabling the control system to cause piston 11 and divider plate 25 to be again actuated in the manner described above. (It should be noted that the precise details of the engine and hydraulic pump and the hydraulic control system are not set forth because such systems are readily commercially available and are therefore deemed to be well within the purview of those skilled in the art.

As soon as wheel 53 is at its original position and cutter 35 has been completely lifted, as determined by microswitch 99, cylinder 15 retracts piston 11 to its forward position (in the direction indicated by arrow 10 in FIG. 1), causes cylinder 17 to retract divider plate 25 for a long enough time to allow wet adobe material or mud 4 in hopper 3 to fill extrusion chamber 7', closes divider plate 25, and causes cylinder 15 to force piston 17 rearward. This causes spike 13 to dig into a new location on ground surface 22 and continues extrusion of moist adobe block material 33A as machine 1 is moved forward by the opposing forces produced by cylinder 15 on spike 13 and frame 5.

Figure 8:
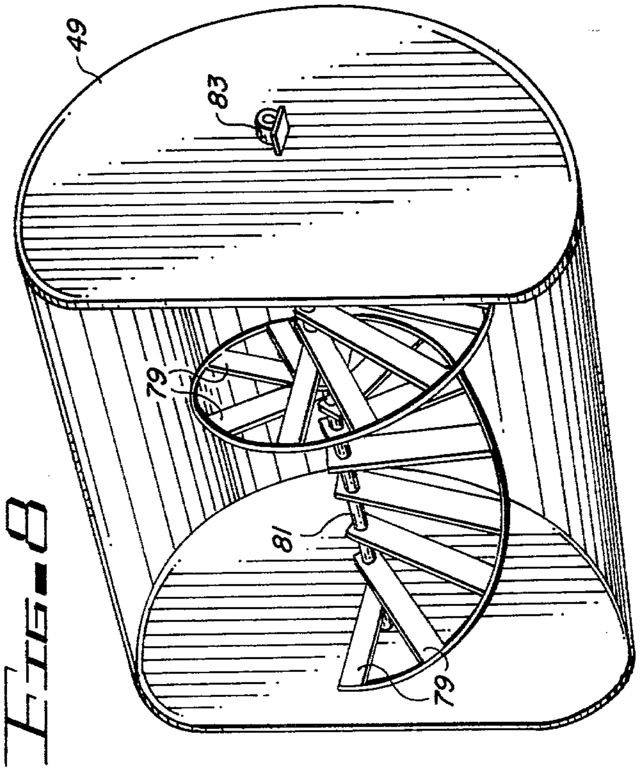
FIG. 8 is a perspective view of the mixer 49 of the machine of FIG. 7.

As shown in FIG. 7, a mixer 66 can be attached to the frame of machine 1. Alluvial clay from a trailer 87 towed behind machine 1 is conveyed upward along a conveyer 89 and loaded into mixer 49 when it is in the configuration indicated by dotted lines 49' in FIG. 7. As shown in FIG. 8, a plurality of helically arranged blades 79 are disposed on an axle 8 (which is turned by means of a motor system, not shown). Blades 79 rotate, chopping up the clay materials, straw, and stabilizer materials, mixing them with water. As the level of wet adobe mud in hopper 3 falls, a new batch of freshly mixed mud is dumped from mixer 49 into hopper 3 by rotating it to the configuration indicated by the solid lines 49' in FIG. 7.

The device described above can be operated by a single person, and has the substantial advantage over the prior art that the extruded adobe bricks can be precisely shaped by means of the extrusion opening 7E and the cutter blade 35 and that handling of the freshly formed wet adobe bricks is not necessary. They are automatically deposited on the ground, where they can be allowed to dry and cure in the sun. The machine described above is mobile, and can easily enable one or two men to make 2 to 3 thousand adobe bricks per day. The basic configuration of the machine is relatively simple compared to automatic adobe brick making machines of the prior art, and requires less human labor for the production of adobe bricks.

While the invention has been described with reference to a particular embodiment thereof, those skilled in the art will be able to make various modifications to the disclosed structure and method without departing from the true spirit and scope of the present invention. For example, multiple mixing bins could be provided to keep hopper 3 filled. Multiple extrusion chambers could be provided to provide several extruded blocks which are then cut to appropriate lengths. Low friction skids could be utilized instead of wheels, and rather than utilizing a spike to engage the ground, a racheting mechanism could be utilized to engage a permanent rail. Alternatively, the device shown could be essentially stationary, and the ground surface 22 could be replaced by a conveyer belt moving at the same rate that fresh adobe material is extruded.

I claim:

1. A method for making bricks from plastic material, said method comprising the steps of:

a. conveying the plastic material into a container;

b. conveying a quantity of the plastic material from the container into an extrusion chamber, the extrusion chamber having an extrusion orifice through which the plastic material in the extrusion chamber can be extruded, the extrusion orifice being positioned to cause extrusion of the plastic material directly onto a surface, a lower edge of the extrusion orifice being approximately parallel to and approximately at the same level as said surface;

c. compressing the plastic material in the extrusion chamber to cause the plastic material therein to be extruded through the extrusion orifice onto said surface, the plastic material being extruded from the orifice at a first velocity;

d. moving the extrusion chamber and the extrusion orifice along said surface during step (c) at a second velocity which is substantially equal to said first velocity, wherein the container includes a hopper attached above the extrusion chamber, the hopper being separated from the extrusion chamber by means of a slidable divider plate, wherein step (b) includes sliding the divider plate in one direction to allow moist adobe material in the hopper to flow into the extrusion chamber and sliding the divider plate in the opposite direction to seal the extrusion chamber from the hopper, whereby no significant deformation of the extruded plastic material occurs as a result of differences between said first and second velocities.

2. The method of claim 1 wherein the plastic material is moist adobe material.

3. The method of claim 2 wherein the extrusion chamber and the hopper attached thereto are supported by wheels which roll along said surface during steps (c) and (d), and wherein said compressing is performed by means of a piston forced into the extrusion chamber.

4. The method of claim 3 further including the step of maintaining the piston in a fixed lateral position relative to said surface during step (c).

5. The method of claim 4 wherein said maintaining of the position of the piston is accomplished by mechanically engaging the piston with said surface during step (c), said surface being a ground surface upon which the wheels roll and upon which the extruded moist adobe material is deposited.

6. The method of claim 4 further including the steps of measuring distance traveled by the extrusion orifice along the ground surface, stopping said compressing, and making a transverse cut through the moist extruded adobe material to make an individual moist adobe brick, said transverse cut being made a fixed distance behind the extrusion orifice.

7. The method of claim 6 further including continuing steps (c) and (d) after completion of said transverse cut.

8. A method for making bricks from plastic material, said method comprising the steps of:

a. conveying the plastic material into a container;

b. conveying a quantity of the plastic material from the container into an extrusion chamber, the extrusion chamber having an extrusion orifice through which the plastic material in the extrusion chamber can be extruded, the extrusion orifice being positioned to cause extrusion of the plastic material directly onto a stationary surface, a lower edge of the extrusion orifice being approximately parallel to and approximately at the same level as said stationary surface;

c. compressing the plastic material in the extrusion chamber to cause the plastic material therein to be extruded through the extrusion orifice onto said stationary surface, the plastic material being extruded from the orifice at a first velocity;

d. moving the extrusion chamber and the extrusion orifice along said stationery surface during step (c) at a second velocity which is substantially equal to said first velocity, said stationery surface supporting a machine which includes the extrusion chamber and the orifice, whereby no significant deformation of the extruded plastic material occurs as a result of differences between said first and second velocities.

* * * * *